(12) United States Patent
Fu et al.

(10) Patent No.: US 9,256,929 B2
(45) Date of Patent: Feb. 9, 2016

(54) FILTERING METHOD AND APPARATUS FOR RECOVERING AN ANTI-ALIASING EDGE

(71) Applicant: Fujitsu Limited, Kawasaki-shi, Kanagawa (JP)

(72) Inventors: Xuan Fu, Beijing (CN); Jiangli Ye, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/301,665

(22) Filed: Jun. 11, 2014

(65) Prior Publication Data
US 2014/0369600 A1 Dec. 18, 2014

(30) Foreign Application Priority Data

Jun. 17, 2013 (CN) .......................... 2013 1 0238187

(51) Int. Cl.
*G06T 5/20* (2006.01)
*G06T 5/00* (2006.01)

(52) U.S. Cl.
CPC . *G06T 5/20* (2013.01); *G06T 5/002* (2013.01); *G06T 2200/12* (2013.01); *G06T 2207/20012* (2013.01); *G06T 2207/20192* (2013.01)

(58) Field of Classification Search
CPC ........... G06T 5/003; G06T 5/20; G06T 5/002; G06T 5/00; G06T 2207/20182; G06T 2200/12; G06T 5/001; G06T 7/0085
See application file for complete search history.

(56) References Cited

U.S. PATENT DOCUMENTS

| | | | |
|---|---|---|---|
| 5,023,919 A | 6/1991 | Wataya | |
| 5,218,649 A * | 6/1993 | Kundu et al. | 382/180 |
| 5,550,936 A * | 8/1996 | Someya et al. | 382/263 |
| 5,799,111 A * | 8/1998 | Guissin | 382/254 |
| 6,947,058 B1 * | 9/2005 | Elmquist | 345/611 |
| 7,612,784 B2 * | 11/2009 | Oka | 345/615 |
| 8,233,586 B1 * | 7/2012 | Boas | 378/4 |
| 2007/0252899 A1 * | 11/2007 | Shimizu et al. | 348/222.1 |
| 2009/0046942 A1 * | 2/2009 | Aiso | 382/266 |
| 2010/0002953 A1 * | 1/2010 | Kirenko et al. | 382/268 |
| 2010/0309345 A1 * | 12/2010 | Zimmer et al. | 348/242 |
| 2012/0155783 A1 * | 6/2012 | Huang et al. | 382/260 |
| 2013/0071025 A1 * | 3/2013 | Jang et al. | 382/167 |
| 2014/0176592 A1 * | 6/2014 | Wilburn et al. | 345/589 |

OTHER PUBLICATIONS

Extended European Search Report dated Oct. 29, 2014 in corresponding European Patent Application No. 14171125.9.
Spann et al., "Adaptive Gaussian weighted filtering for image segmentation", Pattern Recognition Letters, vol. 8, No. 4, Nov. 1988, pp. 251-255.
Invitation to File a Search Results or a Statement of Non-Availability mailed Feb. 17, 2015 for corresponding European Patent Application No. 14171125.9.

* cited by examiner

*Primary Examiner* — Jingge Wu
(74) *Attorney, Agent, or Firm* — Staas & Halsey LLP

(57) ABSTRACT

Embodiments provide a filtering method and apparatus for recovering an anti-aliasing edge. The method includes: calculating, for a nonlinearly filtered image, a variance value of an area surrounding a current pixel used for identifying an edge of the image; and re-filtering the current pixel when the variance value is greater than a predefined first threshold value, so as to recover an anti-aliasing edge. With the embodiments of the present application, aliasing noises resulted from nonlinear transform may be alleviated, thereby recovering an anti-aliasing edge of a natural object.

6 Claims, 7 Drawing Sheets

FILTERING METHOD AND APPARATUS FOR RECOVERING AN ANTI-ALIASING EDGE

CROSS REFERENCE TO RELATED APPLICATIONS

This application claims the benefit of Chinese Application No. 201310238187.4, filed Jun. 17, 2013, the disclosure of which is incorporated herein by reference.

TECHNICAL FIELD

The present application relates to image processing technologies, and in particular to a filtering method and apparatus for recovering an anti-aliasing edge.

BACKGROUND

A natural object usually has smooth edges, hence, a natural image taken by a camera should keep such a characteristic. However, as various nonlinear transform methods (such as threshold value judgment, gamma correction, color transform, histogram equalization, and bilateral filtering, etc.) are often used in image signal processing, such transform methods will result in aliasing noises at image edges due to a nonlinear characteristic of itself, while well performing noise lowering or enhancement, thereby affecting evaluation of the image by the people.

In order to obtain an image of smooth edges, aliasing noises resulted from nonlinear transform need to be alleviated or eliminated, so as to recover anti-aliasing edges of a natural object. However, the inventors found that in the relevant art, there exists no processing method for a nonlinearly filtered image, and there exist no method and apparatus for recovering anti-aliasing edges, hence, in some scenarios, a nonlinearly filtered image has no natural edge.

It should be noted that the above description of the background art is merely provided for clear and complete explanation of the present application and for easy understanding by those skilled in the art. And it should not be understood that the above technical solution is known to those skilled in the art as it is described in the background art of the present application.

SUMMARY

An object of the embodiments of the present application is to provide a filtering method and apparatus for recovering an anti-aliasing edge, which may alleviate aliasing noises resulted from nonlinear transform, thereby recovering anti-aliasing edges of an image of a natural object.

According to one aspect of the embodiments of the present application, there is provided a filtering method for recovering an anti-aliasing edge, including:

calculating, for a nonlinearly filtered image, a variance value of an area surrounding a current pixel, the variance value is used for identifying an edge of the image; and re-filtering the current pixel when the variance value is greater than a predefined first threshold value, so as to recover an anti-aliasing edge.

According to another aspect of the embodiments of the present application, there is provided a filtering apparatus for recovering an anti-aliasing edge, including:

a variance value calculation unit configured to calculate, for a nonlinearly filtered image, a variance value of an area surrounding a current pixel, the variance value is used for identifying an edge of the image; and a re-filtering unit, configured to re-filter the current pixel to recover an anti-aliasing edge when the variance value is greater than a predefine first threshold value.

The advantage of the embodiments of the present application resides in that on a basis of nonlinear filtering, an image is re-filtered by using adaptive gradient weighting filtering based on a variance value, which may alleviate aliasing noises resulted from nonlinear transform, thereby recovering anti-aliasing edges of an image of a natural object.

With reference to the following description and drawings, the particular embodiments of the present application are disclosed in detail, and the principle of the present application and the manners of use are indicated. It should be understood that the scope of the embodiments of the present application is not limited thereto. The embodiments of the present application contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "includes/including/comprises/comprising" when used in this specification is taken to specify the presence of stated features, integers, steps or components but does not preclude the presence or addition of one or more other features, integers, steps, components or groups thereof.

DETAILED DESCRIPTION

These and further aspects and features of the present application will be apparent with reference to the following description and attached drawings. In the description and drawings, particular embodiments of the application have been disclosed in detail as being indicative of some of the ways in which the principles of the application may be employed, but it is understood that the application is not limited correspondingly in scope. Rather, the application includes all changes, modifications and equivalents coming within the spirit and terms of the appended claims.

Embodiment 1

Figure 1:
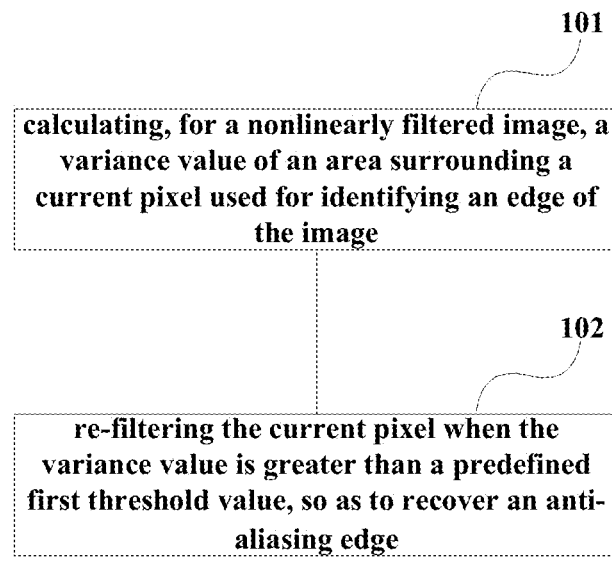
FIG. 1 is a flowchart of a filtering method of an embodiment of the present application.

An embodiment of the present application provides a filtering method for recovering an anti-aliasing edge. FIG. 1 is a flowchart of the filtering method of the embodiment of the present application. As shown in FIG. 1, the method includes:

step 101: calculating, for a nonlinearly filtered image, a variance value of an area surrounding a current pixel used for identifying an edge of the image; and step 102: re-filtering the current pixel when the variance value is greater than a predefined first threshold value, so as to recover an anti-aliasing edge.

In this embodiment, for the nonlinearly filtered image, as nonlinear transform results in aliasing noises, anti-aliasing edges need to be recovered, so that edges of the image are more smooth.

In step 101, the area surrounding the current pixel may be a pixel area taking the current pixel as the center, which may be a square pixel area of a number of pixels being 5×5, 7×7, 9×9 or 11×11, or a square pixel area of a number of columns or rows being other values. However, the present application is not limited thereto, and a particular area may be determined according to an actual situation. For example, the area may be other shapes than square, and the number of columns or rows of the area is not defined as an odd number, which may also be an even number; and the area is not symmetrical when the number of columns is an odd number.

It should be noted that the size of the area is related to some basic characteristics of the image. For example, if a range of an aliasing noise of an object edge resulted from nonlinear filtering is larger, the area of the area needs to be set larger to recover the anti-aliasing edges. However, if the area is set too large, it will result in that a range of edge blur becomes large, making the image look not so sharp. Hence, the size of the area should be selected comprehensively and on balance, and is not the larger the better, or the smaller the better.

In a particular mode of implementation, a variance value of the area surrounding the current pixel may be obtained for example by calculating variance, standard variance, or a histogram, etc., of pixels in the area. The variance value may be used in the subsequence steps for identifying an edge area and a flat area of an image.

In step 102, the calculated variance value is compared with a predefined first threshold value, so as to judge whether the current pixel is located at an edge of an object in the image. In a particular mode of implementation, the predefined first threshold value may be set as per different types of images according to experiences of image processing. For example, different first threshold values may be set for images mainly containing portraits and images mainly containing sceneries. And in another mode of implementation, as an aliasing edge of an image is resulted from nonlinear transform, it may considered to set a first threshold value corresponding to a mode of nonlinear transform according to the mode of nonlinear transform experienced by the image.

In this embodiment, if the calculated variance value is greater than the first threshold value, it shows that the current pixel is located at an edge of the object. And the larger the variance value, the sharper the edge, namely, the difference between object luminance at the two sides of the edge is larger. In such a case, the current pixel needs to be re-filtered to recover the anti-aliasing edge of the image.

Figure 2:
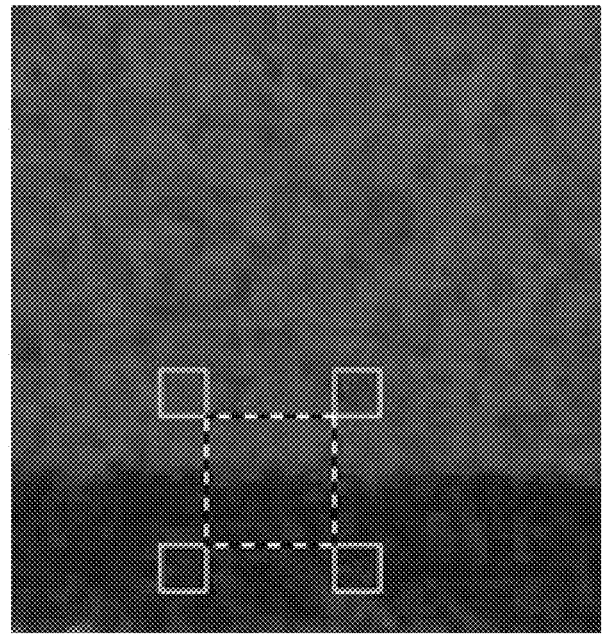
FIG. 2 is a schematic diagram of a current pixel being located at an edge of an object in an image of an embodiment of the present application.

FIG. 2 is a schematic diagram of a current pixel being located at an edge of an object in an image. In the case shown in FIG. 2, when the current pixel is located at the edge of the object, a variance value of pixels within the area surrounding the current pixel is greater than the predefined first threshold value.

In another particular mode of implementation, if the calculated variance value is not greater than the first threshold value, it may show that the current pixel is located in a flat area, and in such a case, no processing is needed for the current pixel.

Figure 3:
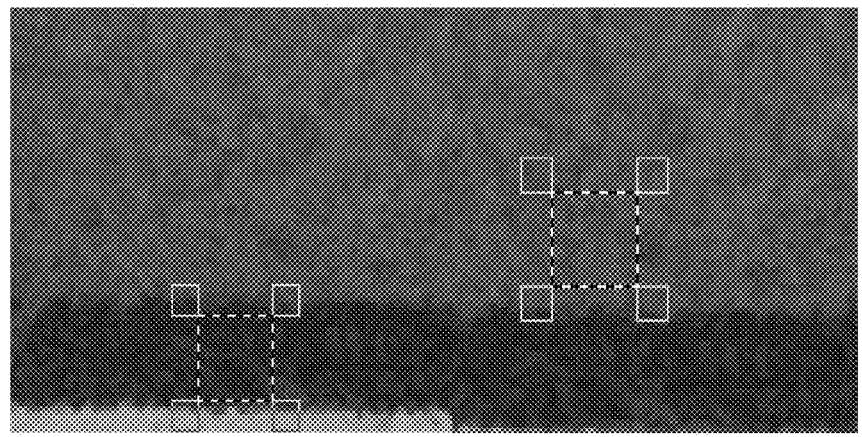
FIG. 3 is a schematic diagram of a current pixel being located in a flat area in an image of an embodiment of the present application.

FIG. 3 is a schematic diagram of a current pixel being located in a flat area in an image. In the case shown in FIG. 3, when the current pixel is located in the flat area in the image, a variance value of pixels within the area surrounding the current pixel is not greater than the predefined first threshold value.

Figure 4:
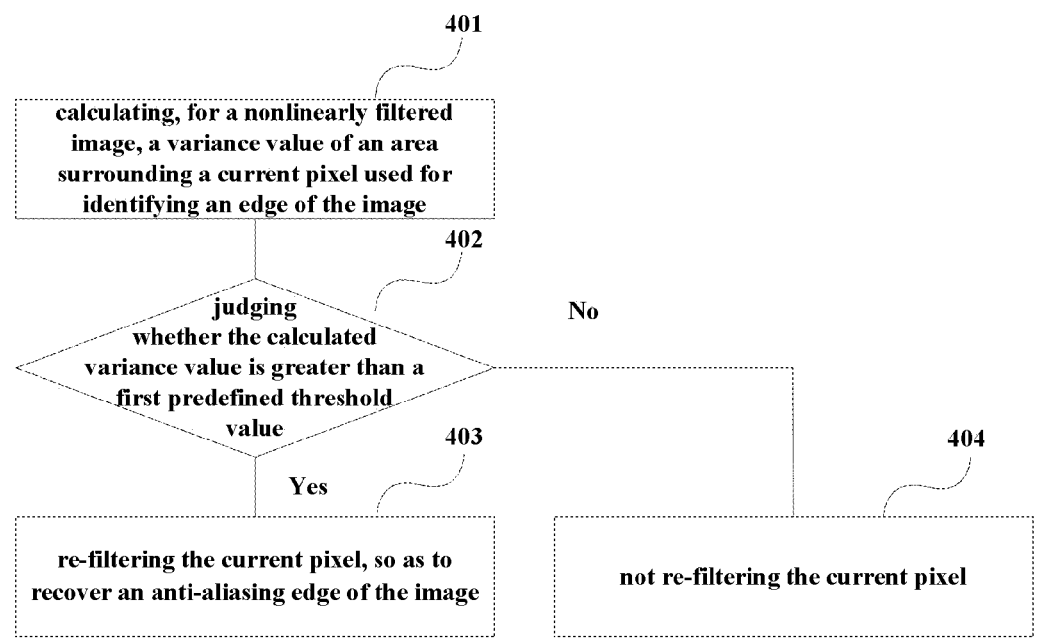
FIG. 4 is another flowchart of the filtering method of the embodiment of the present application.

FIG. 4 is another flowchart of the filtering method of the embodiment of the present application. As shown in FIG. 4, the method includes:

step 401: calculating, for a nonlinearly filtered image, a variance value of an area surrounding a current pixel used for identifying an edge of the image;

step 402: judging whether the calculated variance value is greater than a first predefined threshold value; executing step 403 when the calculated variance value is greater than the first predefined threshold value; and executing step 404 when the calculated variance value is less than or equal to the first predefined threshold value;

step 403: re-filtering the current pixel, so as to recover an anti-aliasing edge of the image; and step 404: not re-filtering the current pixel.

In this embodiment, the pixels may be filtered one by one, and after multiple pixels of the image are processed as described above, the anti-aliasing edge of the nonlinearly filtered image may be recovered.

With the above embodiment of the present application, for a nonlinearly filtered image, a variance value of an area neighboring the current pixel is calculated, it is judged that the current pixel is located at an edge area of the object in the image, and the current pixel is re-filtered. Therefore, re-filtering on the basis of the nonlinear filtering may alleviate aliasing noises resulted from the nonlinear transform, thereby recovering an anti-aliasing edge of a natural object.

Embodiment 2

An embodiment of the present application provides a filtering method for recovering an anti-aliasing edge, which further describes the present application on the basis of Embodiment 1; where, contents identical to those in Embodiment 1 shall not be described any further.

Figure 5:
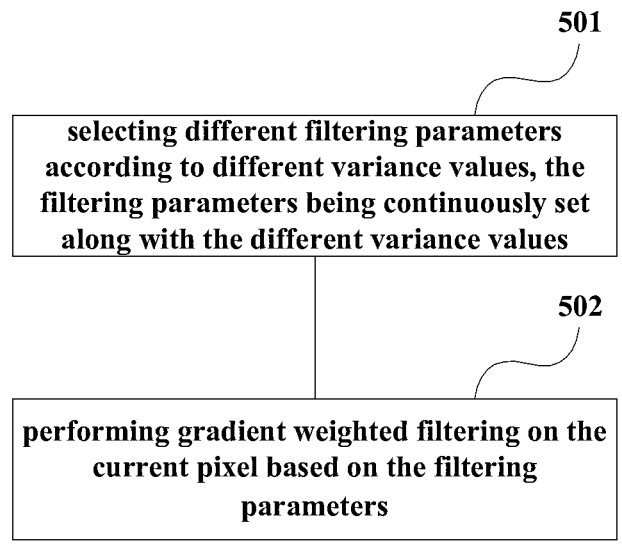
FIG. 5 is flowchart of another method for re-filtering a current pixel of an embodiment of the present application.

FIG. 5 is flowchart of a method for re-filtering a current pixel of an embodiment of the present application, showing detailed contents of step 102 or 403. In this embodiment, as shown in FIG. 5, the re-filtering the current pixel includes:

step 501: selecting different filtering parameters according to different variance values, the filtering parameters being continuously set along with the different variance values; and step 502: performing gradient weighted filtering on the current pixel based on the filtering parameters.

In step 501, when the calculated variance value is greater than the first threshold value and the current pixel is re-filtered, different filtering parameters may be selected according to different variance values, the filtering parameters being continuously set along with the different variance values; hence, the result of filtering is more natural.

Generally speaking, aliasing is more serious for an edge of relatively weak contrast, and aliasing is relatively small for an edge of intense contrast. Therefore, in setting a filtering parameter according to the variance value, filtering intensity of an edge of lower contrast may be higher than that of an edge of intense contrast, thereby adaptively setting the filtering parameter.

Figure 6:
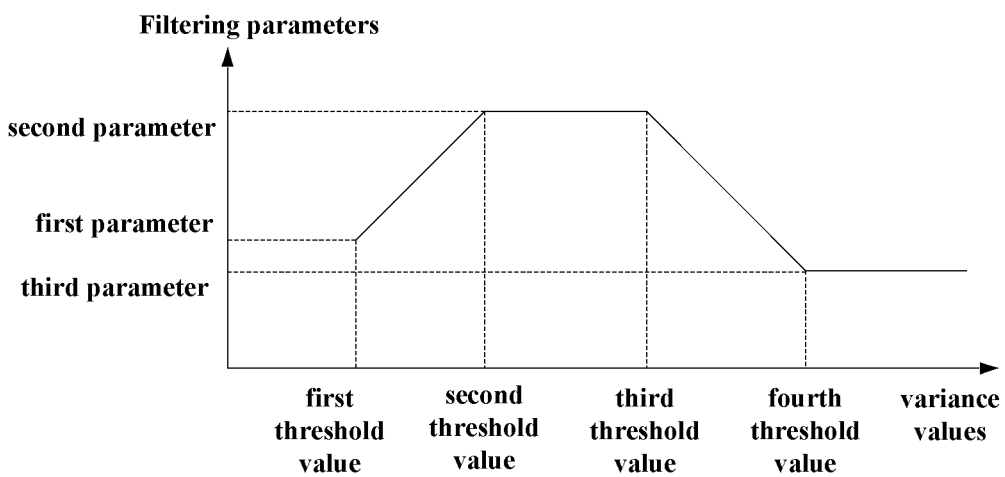
FIG. 6 is a set curve of an adaptive filtering parameter of an embodiment of the present application.

FIG. 6 is a set curve of an adaptive filtering parameter of an embodiment of the present application. As shown in FIG. 6, the filtering parameters are selected from continuous numeric values between a first parameter and a second parameter, if the variance value is greater than the first threshold value and less than a predefined second threshold value; the second parameter is selected as the filtering parameter, if the variance value is greater than the second threshold value and less than a predefined third threshold value; the filtering parameters are selected from continuous numeric values between the second parameter and a third parameter, if the variance value is greater than the third threshold value and less than a predefined fourth threshold value; and the third parameter is selected as the filtering parameter, if the variance value is greater than the fourth threshold value; where the third parameter is less than the first parameter, and the first parameter is less than the second parameter. Therefore, the filtering parameters may be adaptively set, and filtering intensity in re-filtering may be hence adaptively adjusted according to the variance value.

It should be noted that FIG. 6 shows only a mode of implementation of an adaptive filtering parameter. However, the present application is not limited thereto, and a curve of relationship between a variance value and a selected filtering parameter may be of other forms; furthermore, in some modes of implementation, a filtering parameter may be constant.

In this embodiment, after the filtering parameters are determined, in step 502, gradient weighted filtering may be performed on the current pixel based on the determined filtering parameters. In a particular mode of implementation, multiple existing manners of filtering may be employed for re-filtering a current pixel.

A particular process of filtering shall be described below taking gradient weighted filtering as an example. In the gradient weighted filtering, a used filtering parameter may be a sigma parameter, and filtering intensity may be adjusted by the sigma parameter.

Figure 7:
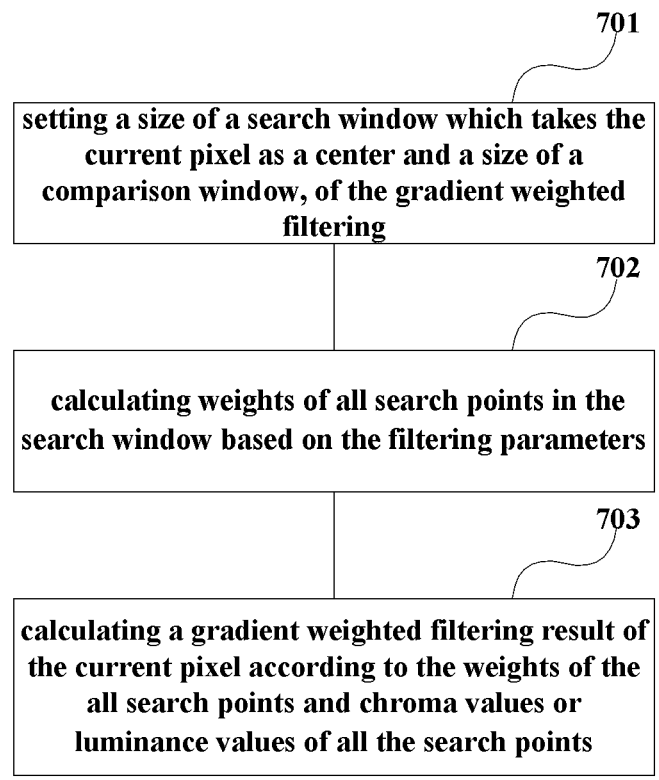
FIG. 7 is a flowchart of a method of gradient weighting filtering of an embodiment of the present application.

FIG. 7 is a flowchart of a method of gradient weighting filtering of an embodiment of the present application. As shown in FIG. 7, the gradient weighted filtering in this embodiment may include the steps of:

step 701: setting a size of a search window which takes the current pixel as a center and a size of a comparison window, of the gradient weighted filtering;

step 702: calculating weights of all search points in the search window based on the filtering parameters; and step 703: calculating a gradient weighted filtering result of the current pixel according to the weights of the all search points and chroma values or luminance values of all the search points.

In step 701, the search window is set taking the current pixel as a center, and may be a pixel area of a number of pixels being 5×5, 7×7, 9×9 or 11×11, or other numbers. The purpose of setting the search window is to find pixels having a relatively high correlation with the current pixel in an area which takes the current pixel as a center, so as to perform anti-aliasing smooth filtering on the current pixel. Therefore, the larger the search window, the more pixels having a relatively high correlation, and the filtering result is better. However, the amount of calculation will be increased by n^2 if the window is larger, hence, a suitable size of the search window needs to be selected comprehensively and on balance.

Furthermore, for each pixel of the search window, there may exist a comparison window which takes the pixel as a center, and the size of the comparison window may be identical to that of the search window. For example, it may also be a pixel area of a number of pixels being 5×5, 7×7, 9×9 or 11×11, or other numbers. However, the size of the comparison window may be different from that of the search window. The present application shall be described below taking that the comparison window is of a size of 15×15 as an example.

In step 702, the weight of each search point in the search window may be calculated one by one. In a particular mode of implementation, for each search point in the search window, a weight of a search point may be calculated by using for example the method shown in FIG. 8. Whether there exists a search point in the search window that is not calculated is judged after a search point is calculated; if there exists a search point that is not calculated, it is calculated by using the method shown in FIG. 8; and if all the search points in the search window are calculated, step 703 is executed.

Figure 8:
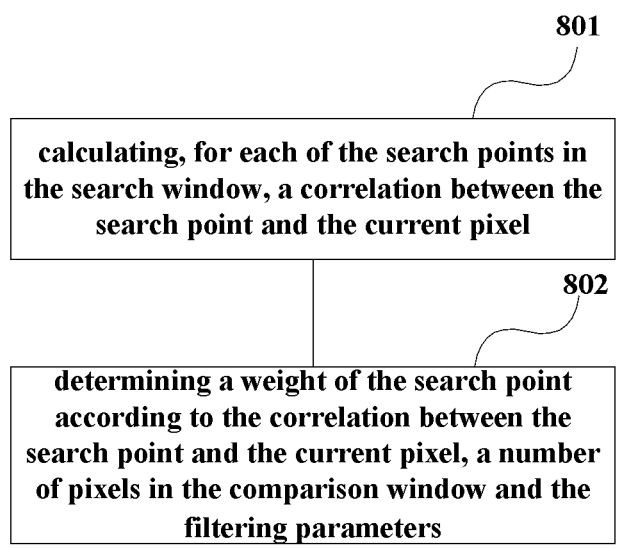
FIG. 8 is a flowchart of a method for calculating a weight of a search point of an embodiment of the present application.

FIG. 8 is a flowchart of a method for calculating a weight of a search point of an embodiment of the present application. As shown in FIG. 8, the method for calculating a weight includes:

step 801: calculating, for each of the search points in the search window, a correlation between the search point and the current pixel; and step 802: determining a weight of the search point according to the correlation between the search point and the current pixel, a number of pixels in the comparison window and the filtering parameters.

In step 801, the method for calculating the correlation between the search point and the current pixel may be, for example, subtracting the comparison window which takes the search point as a center from the search window which takes a point to be filtered (i.e. the current pixel) as a center in a manner of one pixel by one pixel, and adding up all of the obtained differences after taking absolute values thereof. That is, following formula is used:

$$SAD=\text{SUM}(ABS(\text{Diff}\_15\times15))$$

where, the correlation is denoted by a SAD value, Diff_15×15 are differences obtained by subtracting all the pixels one by one in a 15×15 window, ABS is to take an absolute value, and SUM is summation. In a particular mode of implementation, the differences of the pixels may be differences of luminance of the pixels.

In step 802, the weight of the search point may be determined according to the correlation between the search point and the current pixel, the number of pixels in the comparison window and the filtering parameters. In a particular mode of implementation, the weight Weight(i,j) of the search point may be obtained through calculation by using for example the following formula:

$$\text{Weight}(i,j)=\exp(-SAD/\text{Size}/\text{sigma})$$

where, (i,j) denotes coordinates of the search point, Size denotes the number of pixels in the comparison window, for example, for a 15×15 comparison window, the number of pixels contained in it is 15×15=225, Sigma may be an adaptive filtering parameter set according to the method of this embodiment, and SAD is the correlation between the search point and the current pixel.

In this way, by cyclically carrying out the method shown in FIG. 8, for each search point in the search window, the weight Weight(i,j) of the search point may be calculated according to the method, so as to obtain weights of all the search points in the search window. Furthermore, for each search point in the same search window, both the filtering parameter Sigma and the number of pixels in the search window are fixed values. Therefore, a weight Weight(i,j) of each search point is mainly determined by the correlation between the comparison window taking the search point as the center and the window taking the current pixel as the center.

In this embodiment, in calculating the weight of the search point, such a scenario possibly occurs: a search point in the search window coincides with the current pixel. Therefore, the correlation SAD between the search point and the current pixel is 0, and hence the calculated weight Weight(i,j) of the search point is 1. And such a weight of a fixed value 1 cannot truly reflect correlation between the pixels in a search range.

Therefore, after weights of all the search points in the search window are obtained, a maximum value of the weights of all the search points may be assigned to the current pixel, and is taken as a weight of the current pixel. That is, there exists at least one pixel in the search range having a weight equivalent to that of the current pixel, thereby ensuring an effect of anti-aliasing smoothing filtering.

Next, turning back to FIG. 7, after the weights of all the search points in the search window are obtained, step 703 may be executed, and a gradient weighted filtering result of the current pixel is calculated according to the weights of the all search points and chroma values or luminance values of all the search points.

In a particular mode of implementation, the gradient weighted filtering result Output of the current pixel may be obtained by using a formula below:

$$\text{Output}=\text{SUM}(\text{weight}(i,j)*Y(i,j))/\text{SUM}(\text{weight}(i,j));$$

where, Y(i,j) is a chroma value or luminance value of a search point of coordinates (i,j), and Weight(i,j) is a weight of the search point of coordinates (i,j).

Therefore, with the embodiment above, re-filtering of the current pixel is performed. It should be noted that the present application is described above taking only gradient filtering as an example. However, the present application is not limited thereto. For example, those skilled in the art may appropriately modify or vary the above formulae, etc.

With the above embodiment of the present application, on a basis of nonlinear filtering, an image is re-filtered by using adaptive gradient weighting filtering based on a variance value, which may alleviate aliasing noises resulted from nonlinear transform, thereby recovering anti-aliasing edges of an image of a natural object.

Embodiment 3

An embodiment of the present application provides a filtering apparatus for recovering an anti-aliasing edge, corresponding to the filtering method described in Embodiment 1. Where contents identical to those in Embodiment 1 shall not be described any further.

Figure 9:
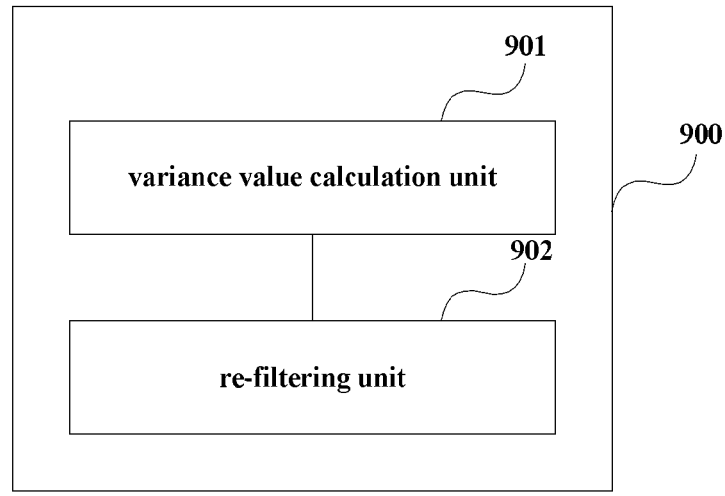
FIG. 9 is a schematic diagram of the structure of a filtering apparatus of an embodiment of the present application.

FIG. 9 is a schematic diagram of the structure of the filtering apparatus of the embodiment of the present application. As shown in FIG. 9, the filtering apparatus 900 includes: a variance value calculation unit 901 and a re-filtering unit 902.

The relevant art may be referred to for other parts of the filtering apparatus 900, which shall not be described herein any further.

The variance value calculation unit 901 is configured to calculate, for a nonlinearly filtered image, a variance value of an area surrounding a current pixel used for identifying an edge of the image, and the re-filtering unit 902 is configured to re-filter the current pixel to recover an anti-aliasing edge when the variance value is greater than a predefine first threshold value. In this embodiment, the description of the manners of execution of steps 101 and 102 in Embodiment 1 may be referred to for manners of execution of the variance value calculation unit 901 and the re-filtering unit 902.

Figure 10:
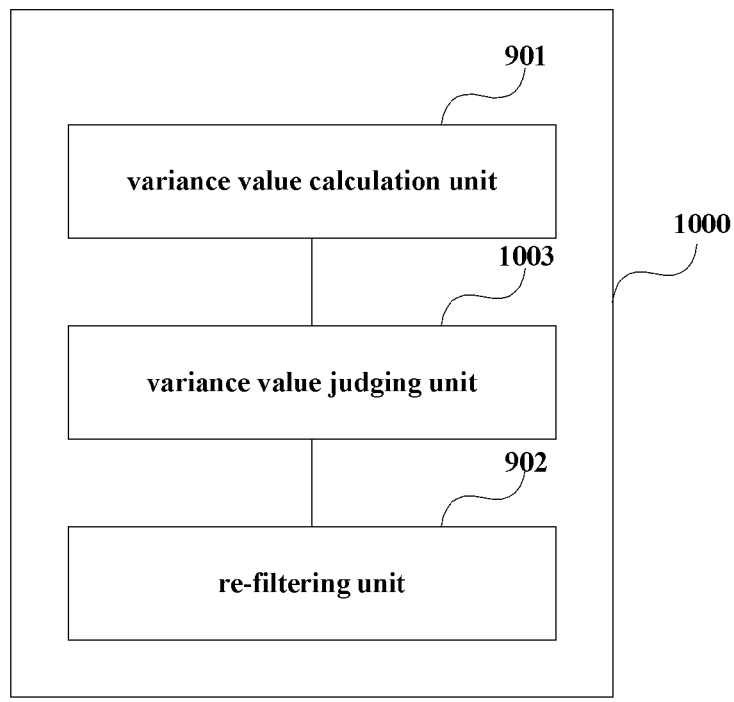
FIG. 10 is another schematic diagram of the structure of the filtering apparatus of the embodiment of the present application.

FIG. 10 is another schematic diagram of the structure of the filtering apparatus of the embodiment of the present application. As shown in FIG. 10, the filtering apparatus 1000 includes: a variance value calculation unit 901 and a re-filtering unit 902, as described above.

As shown in FIG. 10, the filtering apparatus 1000 further includes a variance value judging unit 1003 configured to judge whether the variance value calculated by the variance value calculation unit 901 is greater than a first threshold value. If it is judged by the variance value judging unit 1003 that the variance value is greater than the first threshold value, the re-filtering unit 902 re-filters the current pixel to recover the anti-aliasing edge of the image.

With the above embodiment of the present application, for a nonlinearly filtered image, the variance value of the area surrounding the current pixel is calculated. When the variance value is greater than the first threshold value, it is judged that the current pixel is located at an edge area of the object in the image, and the current pixel is re-filtered. Therefore, re-filtering on a basis of nonlinear filtering may alleviate aliasing noises resulted from nonlinear transform, thereby recovering anti-aliasing edges of an image of a natural object.

Embodiment 4

An embodiment of the present application provides a filtering apparatus for recovering an anti-aliasing edge, which further describes the present application on the basis of Embodiment 3 and corresponds to the filtering method described in Embodiment 2. Where contents identical to those in Embodiment 2 shall not be described any further.

Figure 11:
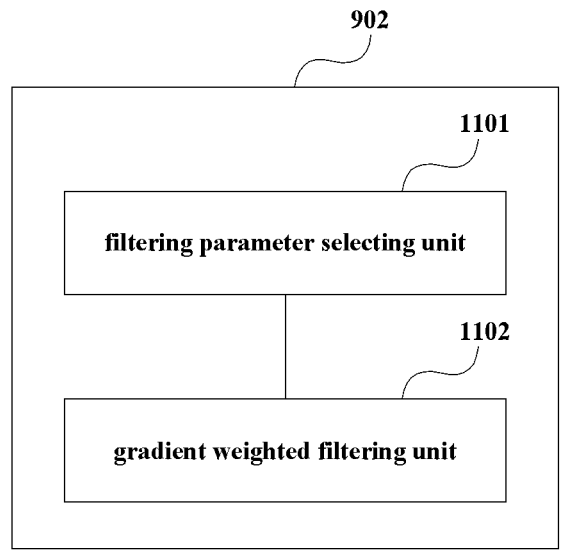
FIG. 11 is a schematic diagram of the structure of a re-filtering unit of an embodiment of the present application.

FIG. 11 is a schematic diagram of the structure of the re-filtering unit 902 of the embodiment of the present application. As shown in FIG. 11, the re-filtering unit 902 includes:

a filtering parameter selecting unit 1101 configured to select different filtering parameters according to variance values; where the filtering parameters are continuously set along with the different variance values; and a gradient weighted filtering unit 1102 configured to perform gradient weighted filtering on the current pixel based on the filtering parameters.

In this embodiment, a manner of selecting a filtering parameter of the filtering parameter selecting unit 1101 is identical that described in Embodiment 2, and the gradient weighted filtering unit 1102 uses a Sigma parameter as the filtering parameter, and the Sigma parameter is used to adjust filtering intensity.

Figure 12:
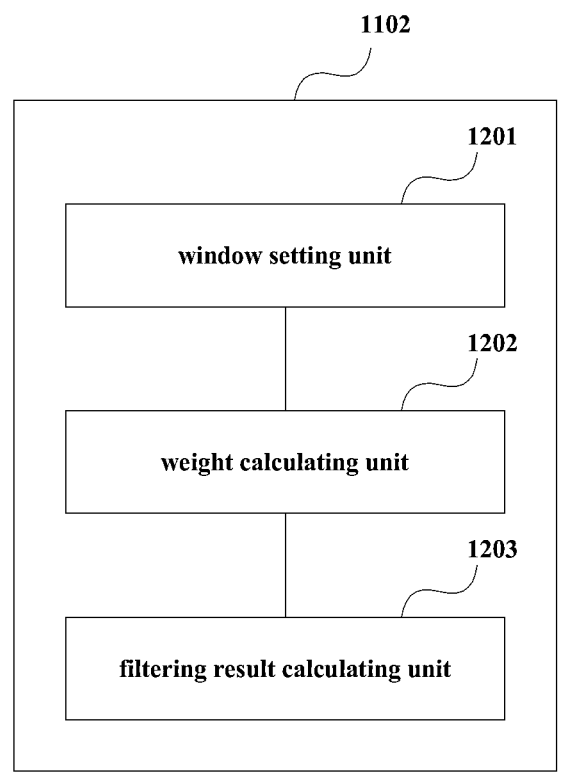
FIG. 12 is a schematic diagram of the structure of a gradient weighted filtering unit of an embodiment of the present application.

FIG. 12 is a schematic diagram of the structure of the gradient weighted filtering unit 1102 of the embodiment of the present application. As shown in FIG. 12, the gradient weighted filtering unit 1102 includes:

a window setting unit 1201 configured to set a size of a search window which takes the current pixel as a center and a size of a comparison window, of the gradient weighted filtering;

a weight calculating unit 1202 configured to calculate weights of all search points in the search window based on the filtering parameters; and a filtering result calculating unit 1203 configured to calculate a gradient weighted filtering result of the current pixel according to the weights of all the search points and chroma values or luminance values of all the search points.

In this embodiment, the manners of execution of steps 701-703 in Embodiment 2 may be referred to for manners of execution of components of the gradient weighted filtering unit 1102.

Figure 13:
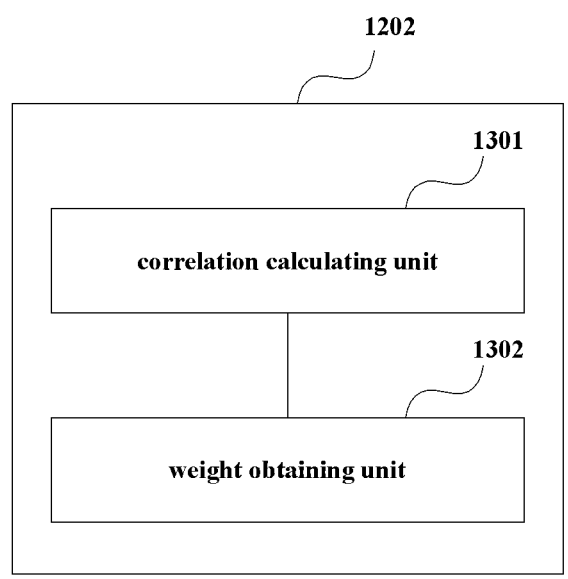
FIG. 13 is a schematic diagram of the structure of a weight calculating unit of an embodiment of the present application.

FIG. 13 is a schematic diagram of the structure of the weight calculating unit 1202 of the embodiment of the present application. As shown in FIG. 13, the weight calculating unit 1202 includes:

a correlation calculating unit 1301 configured to calculate, for each of the search points in the search window, a correlation between the search point and the current pixel; and a weight obtaining unit 1302 configured to determine a weight of the search point according to the correlation between the search point and the current pixel, a number of pixels in the comparison window and the filtering parameters.

In this embodiment, the manners of execution of steps 801 and 802 in Embodiment 2 may be referred to for manners of execution of components of the weight calculating unit 1202.

With the above embodiment of the present application, on a basis of nonlinear filtering, an image is re-filtered by using adaptive gradient weighting filtering based on a variance value, which may alleviate aliasing noises resulted from nonlinear transform, thereby recovering anti-aliasing edges of an image of a natural object.

The above apparatuses and methods of the present application may be implemented by hardware, or by hardware in combination with software. The present application relates to such a computer-readable program that when the program is executed by a logic device, the logic device is enabled to carry out the apparatus or components as described above, or to carry out the methods or steps as described above. The present application also relates to a storage medium for storing the above program, such as a hard disk, a floppy disk, a CD, a DVD, and a flash memory, etc.

The present application is described above with reference to particular embodiments. However, it should be understood by those skilled in the art that such a description is illustrative only, and not intended to limit the protection scope of the present application. Various variants and modifications may be made by those skilled in the art according to the spirits and principle of the present application, and such variants and modifications fall within the scope of the present application.

As for modes of implementation containing the above embodiments, following supplements are further disclosed.

Supplement 1. A filtering method for recovering an anti-aliasing edge, including:

calculating, for a nonlinearly filtered image, a variance value of an area surrounding a current pixel, the variance value is used for identifying an edge of the image; and re-filtering the current pixel when the variance value is greater than a predefined first threshold value, so as to recover an anti-aliasing edge.

Supplement 2. The method according to supplement 1, where the re-filtering the current pixel includes:

selecting filtering parameters according to different variance values, the filtering parameters being continuously set along with the different variance values; and performing gradient weighted filtering on the current pixel based on the filtering parameters.

Supplement 3. The method according to supplement 2, where the selecting filtering parameters according to different variance values includes:

selecting the filtering parameters from continuous numeric values between a first parameter and a second parameter, if the variance value is greater than the first threshold value and less than a predefined second threshold value;

selecting the second parameter as the filtering parameter, if the variance value is greater than the second threshold value and less than a predefined third threshold value;

selecting the filtering parameters from continuous numeric values between the second parameter and a third parameter, if the variance value is greater than the third threshold value and less than a predefined fourth threshold value; and selecting the third parameter as the filtering parameter, if the variance value is greater than the fourth threshold value;

where the third parameter is less than the first parameter, and the first parameter is less than the second parameter.

Supplement 4. The method according to supplement 2, where the performing gradient weighted filtering on the current pixel based on the filtering parameters includes:

setting a size of a search window which takes the current pixel as a center and a size of a comparison window, of the gradient weighted filtering;

calculating weights of all search points in the search window based on the filtering parameters; and calculating a gradient weighted filtering result of the current pixel according to the weights of the all search points and chroma values or luminance values of all the search points.

Supplement 5. The method according to supplement 4, where the calculating weights of all search points in the search window based on the filtering parameters includes:

calculating, for each of the search points in the search window, a correlation between the search point and the current pixel; and determining a weight of the search point according to the correlation between the search point and the current pixel, a number of pixels in the comparison window and the filtering parameters.

Supplement 6. The method according to supplement 5, where the calculating a correlation between the search point and the current pixel includes:

subtracting the comparison window which takes the search point as a center from the comparison window which takes the current pixel as a center in a manner of one pixel by one pixel; and adding up all of the obtained differences after taking absolute values thereof.

Supplement 7. The method according to supplement 6, where the weight of the search point is obtained by using the following formula:

$$\text{Weight}(i,j) = \exp(-SAD/\text{Size}/\text{sigma})$$

where, exp denotes to take an exponent taking a natural logarithm e as the base, Size denotes the number of pixels in the comparison window taking the search point as the center, Sigma is a filtering parameter, and SAD is the correlation between the search point and the current pixel.

Supplement 8. The method according to supplement 5, where the method further includes:

assigning, after obtaining the weights of all the search points in the search window, a maximum value of the weights of all the search points to the current pixel, and taking it as a weight of the current pixel.

Supplement 9. The method according to supplement 4, where the gradient weighted filtering result of the current pixel is obtained by using the following formula:

$$\text{Output}=\text{SUM}(\text{weight}(i,j)*Y(i,j))/\text{SUM}(\text{weight}(i,j));$$

where, Y(i,j) is a chroma value or luminance value of a search point of coordinates (i,j), Weight(i,j) is a weight of the search point of coordinates (i,j), and SUM denotes summation.

Supplement 10. A filtering apparatus for recovering an anti-aliasing edge, including:

a variance value calculation unit configured to calculate, for a nonlinearly filtered image, a variance value of an area surrounding a current pixel, the variance value is used for identifying an edge of the image; and a re-filtering unit configured to re-filter the current pixel to recover an anti-aliasing edge when the variance value is greater than a predefine first threshold value.

Supplement 11. The apparatus according to supplement 10, where the re-filtering unit includes:

a filtering parameter selecting unit configured to select different filtering parameters according to variance values; where the filtering parameters are continuously set along with the different variance values; and a gradient weighted filtering unit configured to perform gradient weighted filtering on the current pixel based on the filtering parameters.

Supplement 12. The apparatus according to supplement 11, where the selecting different filtering parameters according to variance values by the filtering parameter selecting unit includes:

selecting the filtering parameters from continuous numeric values between a first parameter and a second parameter, if the variance value is greater than the first threshold value and less than a predefined second threshold value;

selecting the second parameter as the filtering parameter, if the variance value is greater than the second threshold value and less than a predefined third threshold value;

selecting the filtering parameters from continuous numeric values between the second parameter and a third parameter, if the variance value is greater than the third threshold value and less than a predefined fourth threshold value; and selecting the third parameter as the filtering parameter, if the variance value is greater than the fourth threshold value; where the third parameter is less than the first parameter, and the first parameter is less than the second parameter.

Supplement 13. The apparatus according to supplement 12, where the gradient weighted filtering unit includes:

a window setting unit configured to set a size of a search window which takes the current pixel as a center and a size of a comparison window, of the gradient weighted filtering;

a weight calculating unit configured to calculate weights of all search points in the search window based on the filtering parameters; and a filtering result calculating unit configured to calculate a gradient weighted filtering result of the current pixel according to the weights of all the search points and chroma values or luminance values of all the search points.

Supplement 14. The apparatus according to supplement 13, where the weight calculating unit includes:

a correlation calculating unit configured to calculate, for each of the search points in the search window, a correlation between the search point and the current pixel; and a weight obtaining unit configured to determine a weight of the search point according to the correlation between the search point and the current pixel, a number of pixels in the comparison window and the filtering parameters.

Supplement 15. The apparatus according to supplement 14, where the weight obtaining unit determines the weight of the search point by using the following formula:

$$\text{Weight}(i,j)=\exp(-SAD/\text{Size}/\text{sigma})$$

where, exp denotes to take an exponent taking a natural logarithm e as the base, Size denotes the number of pixels in the comparison window taking the search point as the center, Sigma is a filtering parameter, and SAD is the correlation between the search point and the current pixel.

Supplement 16. The apparatus according to supplement 12, where the gradient weighted filtering result of the current pixel is obtained by using the following formula:

$$\text{Output}=\text{SUM}(\text{weight}(i,j)*Y(i,j))/\text{SUM}(\text{weight}(i,j));$$

where, Y(i,j) is a chroma value or luminance value of a search point of coordinates (i,j), Weight(i,j) is a weight of the search point of coordinates (i,j), and SUM denotes summation.

Supplement 17. A computer-readable program, where when the program is executed in an image processing apparatus, the program enables a computer to carry out the filtering method for recovering an anti-aliasing edge as described in any one of supplements 1-9 in the image processing apparatus.

Supplement 18. A storage medium in which a computer-readable program is stored, where the computer-readable program enables a computer to carry out the filtering method for recovering an anti-aliasing edge as described in any one of supplements 1-9 in an image processing apparatus.

The invention claimed is:

1. A filtering method for recovering an anti-aliasing edge, comprising:

calculating, for a nonlinearly filtered image, a variance value of an area surrounding a current pixel, the variance value is used for identifying an edge of the image; and re-filtering the current pixel when the variance value is greater than a predefined first threshold value, so as to recover an anti-aliasing edge;

wherein the re-filtering the current pixel comprises:

selecting filtering parameters according to different variance values, the filtering parameters being continuously set along with the different variance values;

performing gradient weighted filtering on the current pixel based on the filtering parameters;

wherein the performing gradient weighted filtering on the current pixel based on the filtering parameters comprises:

setting a size of a search window which takes the current pixel as a center and a size of a comparison window, of the gradient weighted filtering;

calculating weights of all search points in the search window based on the filtering parameters; and calculating a gradient weighted filtering result of the current pixel according to the weights of the all search points and chroma values or luminance values of all the search points.

2. The method according to claim 1, wherein the selecting filtering parameters according to different variance values comprises:
  selecting the filtering parameters from continuous numeric values between a first parameter and a second parameter, if the variance value is greater than the first threshold value and less than a predefined second threshold value;
  selecting the second parameter as the filtering parameter, if the variance value is greater than the second threshold value and less than a predefined third threshold value;
  selecting the filtering parameters from continuous numeric values between the second parameter and a third parameter, if the variance value is greater than the third threshold value and less than a predefined fourth threshold value; and
  selecting the third parameter as the filtering parameter, if the variance value is greater than the fourth threshold value;
  wherein the third parameter is less than the first parameter, and the first parameter is less than the second parameter.

3. The method according to claim 1, wherein the calculating weights of all search points in the search window based on the filtering parameters comprises:
  calculating, for each of the search points in the search window, a correlation between the search point and the current pixel; and
  determining a weight of the search point according to the correlation between the search point and the current pixel, a number of pixels in the comparison window and the filtering parameters.

4. The method according to claim 3, wherein the calculating a correlation between the search point and the current pixel comprises:
  subtracting the comparison window which takes the search point as a center from the comparison window which takes the current pixel as a center in a manner of one pixel by one pixel; and
  adding up all of the obtained differences after taking absolute values thereof.

5. The method according to claim 3, wherein the method further comprises:
  assigning, after obtaining the weights of all the search points in the search window, a maximum value of the weights of all the search points to the current pixel, and taking it as a weight of the current pixel.

6. A filtering apparatus for recovering an anti-aliasing edge, comprising:
  a variance value calculation unit configured to calculate, for a nonlinearly filtered image, a variance value of an area surrounding a current pixel, the variance value is used for identifying an edge of the image; and
  a re-filtering unit configured to re-filter the current pixel to recover an anti-aliasing edge when the variance value is greater than a predefine first threshold value;
  wherein the re-filtering unit comprises:
  a filtering parameter selecting unit configured to select different filtering parameters according to variance values; wherein the filtering parameters are continuously set along with the different variance values; and
  a gradient weighted filtering unit configured to perform gradient weighted filtering on the current pixel based on the filtering parameters;
  wherein the gradient weighted filtering unit comprises:
  a window setting unit configured to set a size of a search window which takes the current pixel as a center and a size of a comparison window, of the gradient weighted filtering;
  a weight calculating unit configured to calculate weights of all search points in the search window based on the filtering parameters;
  a filtering result calculating unit configured to calculate a gradient weighted filtering result of the current pixel according to the weights of all the search points and chroma values or luminance values of all the search points.

* * * * *